United States Patent Office
3,126,423
Patented Mar. 24, 1964

3,126,423
PROCESS FOR THE ALKYLATION AND TRANS-ALKYLATION OF BENZENE-HYDROCARBONS
Walter Krönig and Karl-Heinz Vöpel, both of Leverkusen, Germany, assignors to Farbenfabriken Bayer Aktiengesellschaft, Leverkusen, Germany, a corporation of Germany
No Drawing. Filed Nov. 15, 1961, Ser. No. 152,626
Claims priority, application Germany Nov. 26, 1960
14 Claims. (Cl. 260—671)

This invention relates to a process for the alkylation and trans-alkylation of benzene-hydrocarbons. It is known to alkylate and trans-alkylate benzene-hydrocarbons in the presence of Friedel-Crafts catalysts. If aluminium chloride is used as catalyst, then this aluminium chloride is forming catalyst complexes with the hydrocarbons and added hydrochloric acid. This method of procedure which is used industrially on a large scale, has the disadvantage that some of the catalysts used (aluminium chloride and hydrochloric acid or their complexes with the hydrocarbons) remain dissolved in the liquid reaction products and have to be removed therefrom by washing with alkali solutions. Furthermore, the activity of these catalysts decreases relatively quickly, so that fresh quantities of catalysts have constantly to be introduced into the system and spent catalysts have to be removed from the system. Another disadvantage is that the entire system is highly corrosive, i.e. constructional materials having high resistance to corrosion must be used for the equipment.

There have been innumerable experiments in an attempt to obviate these disadvantages by using other catalysts. It has inter alia been found that aluminium silicates having a large intrinsic surface and of the type such as used for example in the mineral oil industry as catalysts for the cracking of mineral oils, are effective catalysts for the alkylation and trans-alkylation of benzene hydrocarbons. It has been found that these catalysts lose their activity relatively quickly so that it has proved desirable in industrial installations to suspend the catalysts in finely divided form in the liquid hydrocarbons to be treated and to maintain the required mean activity by supply of quantities of fresh catalyst and extraction of spent catalyst.

Another class of catalysts has also been proposed, namely catalysts which contain free phosphoric acid. These catalysts can be fixedly arranged in the reaction chamber. They have a good catalytic activity in the alkylation of the benzene hydrocarbons. It is generally advisable with this class of catalysts to add small quantities of water to the hydrocarbons to be treated, so that in this way an adequate activity of the catalyst is maintained. Nevertheless, special measures are necessary when carrying out this process in order to avoid adversely affecting the strength of the catalysts, an example of such a measure being for example the supply of the water to different parts of the reaction chamber. Even then, however, quite specific conditions have to be maintained in order reliably to prevent a mechanical destruction of the catalysts. The maintenance of these conditions is not always easy on an industrial scale. Furthermore it can happen with this process that the phosphoric acid is flushed out of the catalyst by the aqueous reaction product and then must be washed out of the latter. The catalysts also suffer from the disadvantage that they are only able to catalyse the alkylation process but not the trans-alkylation process, which is of great importance and may be essential for the production of some alkylation products which are produced in effecting certain specific changes by the use of transalkylation processes.

It is an object of the instant invention to avoid the above mentioned disadvantages. It is a further object to provide a new catalyst for such alkylation and trans-alkylation processes. Still further objects will appear hereinafter.

It has now been found that these objects can be attained and the disadvantages of the existing processes can be avoided if catalysts based on tungsten compounds are used for the alkylation or trans-alkylation of benzene hydrocarbons.

When tungstic acid or tungstates are used in the production of the catalysts, it is generally the so-called blue tungsten oxide which is predominantly formed under the reaction conditions. The tungsten oxide can with advantage be combined with oxides of the metals of the 2–8 groups of the periodic system of the elements, such as magnesium, zinc, cadmium, aluminium, titanium, zirconium, tin, lead, vanadium, chromium, manganese, iron cobalt or nickel. Good results are for example produced if 0.5–8 atoms, advantageously 2–6 atoms, of tungsten are used to each atom of the said additional metals. These catalyst combinations of tungsten oxide and the said metal oxides can also contain other compounds, such as phosphoric acid or silicic acid. In such cases, about 1 atom of phosphorus or silicon can for example be used to approximately 1 atom of the added metal. In certain cases, it is also possible in the production of the catalysts to start from silicon tungstic acids or phosphotungstic acid and to add the said metal oxides thereto. In the combinations of tungsten oxide, metal oxide and phosphoric acid, it is obvious that the phosphoric acid is so combined that when carrying out the alkylation reaction in the presence of small quantities of water, there is no softening of the catalyst and practically no phosphoric acid is dissolved out of the catalyst.

The said combined catalysts after having been shaped, are advantageously heated prior to use to temperatures between 400° and 800° C., their mechanical strength being thereby substantially improved.

Particularly effective catalysts or catalyst combinations containing tungsten oxide are obtained if the catalysts containing tungsten oxide are treated with hydrogen or hydrogen-containing gases at elevated temperature before being used for alkylation, so that the tungsten compounds in the catalysts are wholly or at least partially transformed into blue tungsten oxide.

On alkylation a reduction of the tungstic acid to blue tungsten oxide is also effected by the reducing action of the reactants, more especially of the olefines. However, it has surprisingly been found that the previous reduction with hydrogen as carried out according to the invention provides more active catalysts. The increase in activity as a result of the initial reduction with hydrogen is shown not only in acceleration of alkylation and trans-alkylation, but also in the possibility of reducing the reaction temperature, which is important for the effective life of the catalysts.

The treatment according to the invention takes place for example at temperatures between 250 and 450° C. with hydrogen or gases containing hydrogen. It is preferably carried out at ordinary pressure, but it is also possible to work at a higher pressure. The treatment time can for example be between 2 and 20 hours. It is advisable to carry out the heating to the said temperatures slowly in order to avoid too sudden a development of heat in the reduction process.

Regenerated catalysts are also advantageously treated in a corresponding manner, that is to say, catalysts which have lost some of their activity as a result of relatively long use for the alkylation reaction and which have been regenerated by a heat treatment in the presence of gases containing oxygen.

The various catalysts preferably have intrinsic surfaces below 50 m.$^2$/g. This has proved to be effective for maintaining a sufficient activity. The said catalysts are characterised by an activity which remains constant over relatively long periods of time. If the activity decreases after a relatively long operational period, the catalysts can easily be regenerated by conducting oxygen-containing gases thereover at temperatures between 450° and 800° C.

Instead of the oxides of tungsten, it is also possible to use tungsten sulphide, more especially tungsten disulphide, if desired with other additives, for example in combination with sulphides or oxides of the aforementioned additional metals. A very effective tungsten sulphide is for example obtained by decomposition of ammonium sulphotungstate in a stream of nitrogen and hydrogen sulphide at about 400°–450° C. When using catalysts containing sulphide, it is desirable to work in the absence of water. The said catalysts or catalyst combinations can also be applied to inert porous supports, and these supports advantageously also have intrinsic surfaces below 50 m.$^2$/g. Suitable supports in this connection are for example aluminium oxide, silicic acid and titanium dioxide, as well as magnesium or aluminium silicates. Where the catalysts are fixedly disposed pills or spherical structures with the dimensions of 2–10 mm., preferably 3–6 mm. are for example suitable. Generally speaking, the size of the pieces of catalysts should not substantially exceed 1/10 of the diameter of the reactor tubes being used.

The said catalyst combinations are not corrosive and also do not produce in the reaction products any substances having a corrosive action. Since these catalysts maintain an adequate activity over a relatively long period of time, it is not necessary to use them suspended in finely divided form in the benzene hydrocarbons to be alkylated, but they can be arranged fixedly in the reaction chamber in the form of lumps. The catalysts not only have the capacity for catalysing the alkylation of benzene hydrocarbons, but they are also catalysts for the trans-alkylation, so that they are capable of general application.

Benzene hydrocarbons which can be used for the alkylation are for example benzene and its homologues, such as toluene, xylenes and the like. Suitable as alkylation agents are, for example, olefines, particularly lower olefines, such as ethylene, propylene and butylenes. It is generally desirable to introduce the olefines in a concentrated form, but the olefines can also be used in admixture with paraffins. With the use of a mixture of for example propylene and propane, the heat of reaction which results is distributed over a relatively large section of the catalyst bed. It has proved to be desirable to use 20–60 mols, and advantageously 30–50 mols of the olefine in the reaction, related to 100 mols of the benzene hydrocarbon to be alkylated, although of course it is also possible to choose other ratios. In general the olefine is almost completely consumed in the alkylation during its passage through the reaction chamber, so that a substantially olefine-free residual gas is formed.

It may be advisable for relatively small quantities of water to be supplied to the reactants. Calculated on the benzene hydrocarbons introduced, quantities of water between 0.01–1% by weight, advantageously 0.03–0.1% by weight, have proved to be suitable. The water can be added as such, but it can also be introduced e.g. in the form of the alcohols corresponding to the olefines, which alcohols are decomposed in the reaction chamber into olefines and water. In carrying out the trans-alkylation, the mixture of benzene or low-alkylated benzenes with more highly alkylated benzenes can be separately introduced into the reaction mixture. However, it is also possible, and this is generally to be preferred, for the alkylation and transalkylation to be allowed to proceed simultaneously, that is to say, the more highly alkylated benzenes, the quantity of which is to be reduced, are returned to the alkylation stage.

Alkylation and trans-alkylation can be carried out in the gas phase, but it has nevertheless been proved to be advantageous to operate in such a way that at least a considerable part of the benzene hydrocarbons or their alkylation products are present in liquid phase in the reaction chamber. It is for example possible to operate at temperatures between 200°–320° C., preferably 240°–280° C. The pressures are so chosen that a substantial part of the benzene hydrocarbons is liquid under the reaction conditions. Pressures which are suitable are for example between 20–100 atmospheres, advantageously 30–70 atmospheres. The throughputs of the reactants through the reaction chamber can for example be so chosen that per hour 0.3–2 kg., advantageously 0.6–1.2 kg., of alkylation product are formed per litre of reaction chamber.

The reactants (benzene hydrocarbons and olefines) are preferably mixed with one another before entering the catalyst chamber, it being possible for them to be heated separately or jointly to the reaction temperature. When the catalyst is used in a fixed bed, the reactants can travel upwardly through the catalyst bed. However it is easier to control the heat of reaction if the reactants are allowed to trickle downwardly through the catalyst bed. It has been found that a more intensive heat exchange between the reactants and the reactor wall is possible in the trickling phase than with an upward flow. Generally speaking, it is advantageous for the catalyst bed to be split up into several parts, for example into a relatively large number of reactor tubes, which are surrounded by a boiling coolant liquid, for example water. In this manner, the heat of reaction can be reliably and usefully dissipated. The reaction tubes can for example have a diameter of 25–75 mm. When working in the trickling phase, the reactants are uniformly distributed to the separate tubes, for example by means of nozzles. The tubes can for example have a length of 2–12 metres advantageously 4–8 metres. The products leaving the reaction chamber are cooled in a heat exchanger and reach a collecting vessel in which a liquid level is maintained. From the liquid portion, the reaction products are extracted, and these are then separated by distillation into their components. The residual gases are discharged from the gas chamber.

*Example 1*

The catalyst is prepared by mixing 2 mols of tungsten oxide with 1 mol of zinc oxide. 30 parts by weight of titanium dioxide are added to 100 parts by weight of this mixture and mixed therewith. This mixture is heated to 400° C. 20 g. of the mixture are introduced into a stirrer-type autoclave with a capacity of 700 cc. As reactants, 185 g. of benzene and 50 g. of a mixture of 94 parts of propylene and 6 parts of propane and 1 cc. of distilled water are introduced into the autoclave, which is then heated to 280° C. and kept for 2 hours at this temperature. The pressure first of all rises to 48 atm. and then falls to 40 atm. The autoclave is then cooled. The liquid reaction product consists of 58% of benzene, 31% of cumene, 10% of diisopropybenzene and 1% of more highly alkylated benzenes.

*Example 2*

For the production of the catalyst, 4 mols of tungstic acid and 0.5 mol of tin dioxide, together with 1 mol of phosphoric acid, are mixed together. The mixture is dried, ground, formed into a paste with water and shaped to provide balls with a diameter of 3 mm., which are thereafter heated to 500° C. 300 cc. of this catalyst are introduced into a vertically disposed tube with an internal diameter of 30 mm., which tube could be cooled from outside by blowing air thereon. A mixture of 450 g. of benzene and 100 g. of propylene (94%) as well as 0.05 g. of water, pre-heated to 250° C. are introduced per hour into the upper part of the reaction tube. The reaction mixture trickles through the catalyst bed, which is kept at a temperature of 260° C. and at a pressure of 50 atm. Following the reaction chamber, the reaction product is cooled and introduced into a separator which is under pressure and in which a liquid level is maintained. The liquid reaction product has the following composition:

68% of benzene
26% of cumene
5% of diisopropylbenzene
0.5% of more highly alkylated benzenes
0.5% of non-aromatic substances.

*Example 3*

For the production of the catalyst, 4 mols of tungstic acid, 0.5 mol of manganese dioxide and 1 mol of phosphoric acid are mixed together, dried, ground and thereafter calcined at 500° C. 20 g. of the catalyst are combined as in Example 1 in a stirrer-type autoclave with 295 g. of benzene and 125 g. of triisopropylbenzene. This mixture is heated to 280° C., a pressure of 30 atm. being adjusted. After cooling, the liquid reaction product is removed from the autoclave. It consists of 48 percent by weight of benzene, 29 percent by weight of cumene, 18 percent by weight of diisopropylbenzene, 4 percent by weight of triisopropylbenzene and 1 percent by weight of more highly alkylated benzenes.

*Example 4*

For the production of the catalyst, 3 mols of tungstic acid are mixed with 1 mol of cadmium oxide and 1 mol of phosphoric acid. The mixture is dried and calcined at 500° C. 20 g. of this mixture are introduced into the autoclave. 420 g. of cumene and 50 g. of propylene (94%) and 2 cc. of water are added. The mixture is heated for 2 hours to 280° C., the pressure being adjusted to 20 atm. After cooling and expansion, the product is removed from the autoclave and it contains 1% of benzene, 64% of cumene, 31% of diisopropylbenzene, 3.5% of more highly alkylated benzenes and 0.5% of non-aromatic substances.

*Example 5*

The catalyst is prepared by mixing 4 mols of tungstic acid, 1 mol of phosphoric acid and ½ mol of cobalt oxide ($Co_3O_4$). The mixture is heated to 450° C. and thereafter reduced for 5 hours at 350° C. by passing hydrogen thereover. The same catalyst, but without previous reduction, is tested for comparison. The alkylation is carried out in a stirrer-type autoclave having a capacity of 700 cc. As reactants, 85 g. of benzene and 50 g. of a mixture of 94 parts by weight of propylene and 6 parts by weight of propane with 1 cc. of distilled water, are introduced into the autoclave, which is then heated to 280° C. and kept for 2 hours at this temperature.

The propylene introduced is completely reacted. The composition of the alkylate in the two comparative experiments (after extraction of unconverted benzene) is as follows:

| Catalyst pre-treatment | Cumene in total product of alkylation | Composition of the alkylate, percent by weight | | | | |
|---|---|---|---|---|---|---|
| | | Cumene | Diisopropylbenzene | | Triisopropylbenzene | Non-aromatic substances |
| | | | m- | p- | | |
| Reduced with $H_2$ | 29.9 | 83.4 | 9.2 | 5.6 | 0.4 | 1.5 |
| Unreduced | 25.7 | 76.4 | 9.7 | 10.8 | 1.3 | 1.8 |

We claim:

1. In the process for the alkylation and transalkylation of benzene hydrocarbons, the improvement which comprises using as catalyst for the alkylation a material comprising tungsten oxide, metal oxide of the 2–8 groups of the periodic systems, and a compound selected from the group consisting of phosphoric acid and silicic acid.

2. In the process according to claim 1, said compound being phosphoric acid.

3. In the process according to claim 2, the proportion of the tungsten oxide to metal oxide being 0.5–8 atoms tungsten to 1 atom of metal of the metal oxide.

4. In the process according to claim 3, wherein the proportion of phosphoric acid is about 1 atom of phosphorus to 1 atom of the metal oxide.

5. In the process according to claim 1, said compound being silicic acid.

6. In the process according to claim 5, the proportion of the tungsten oxide to metal oxide being 0.5–8 atoms of tungsten to 1 atom of metal of the metal oxide.

7. In the process according to claim 6, wherein the proportion of silicic acid is about 1 atom of silicon to 1 atom of the metal of the metal oxide.

8. Process according to claim 1 which comprises transforming tungsten oxide into blue tungsten oxide by a pretreatment with hydrogen at elevated temperature.

9. Process according to claim 1, which comprises carrying out the process at temperatures between 200°–320° C. and under such a pressure that a relatively large part of the benzene hydrocarbons is present in liquid form under the reaction conditions.

10. Process according to claim 1 which comprises that the catalysts are fixedly arranged in the reaction chamber and that the reactants are allowed to trickle through the catalyst bed.

11. Process according to claim 10, which comprises using externally cooled reaction tubes with an internal diameter of 25–75 mm. and reaction lengths of 2–12 metres.

12. Process according to claim 1, which comprises adding water to the reactants in such a quantity that, calculated on the benzene hydrocarbons, 0.01 to 1.0% of water is present in the reaction chamber.

13. Process according to claim 1, wherein benzene is alkylated with lower olefines.

14. Process according to claim 1, wherein benzene is alkylated with propylene.

References Cited in the file of this patent
UNITED STATES PATENTS

| | | |
|---|---|---|
| 2,500,197 | Michael et al. | Mar. 14, 1950 |
| 2,858,349 | Linn | Oct. 28, 1958 |

UNITED STATES PATENT OFFICE
CERTIFICATE OF CORRECTION

Patent No. 3,126,423                          March 24, 1964

Walter Krönig et al.

It is hereby certified that error appears in the above numbered patent requiring correction and that the said Letters Patent should read as corrected below.

Column 4, line 69, for "diisopropybenzene" read -- diisopropylbenzene --; column 6, line 28, after "metal" insert -- of the metal --.

Signed and sealed this 14th day of July 1964.

(SEAL)

Attest:

ESTON G. JOHNSON
Attesting Officer

EDWARD J. BRENNER
Commissioner of Patents